United States Patent [19]
Barry et al.

[11] Patent Number: 5,947,010
[45] Date of Patent: Sep. 7, 1999

[54] CHIP DE-OILER APPARATUS

[75] Inventors: David L. Barry, Highland Village; Timothy A. Johnson, Coppell; Joseph H. Gold, Dallas, all of Tex.

[73] Assignee: Recot, Inc., Pleasanton, Calif.

[21] Appl. No.: 08/941,055

[22] Filed: Sep. 30, 1997

[51] Int. Cl.[6] .................................................. A47J 37/00
[52] U.S. Cl. ................ 99/355; 99/330; 99/410; 99/417; 99/516; 210/167; 210/DIG. 8
[58] Field of Search .............................. 99/330, 336, 339, 99/352, 355, 403–410, 443 R, 443 C, 386, 417, 477, 516; 210/774, 788, 512.1, 242.1, 167, DIG. 8; 426/438, 445, 465, 510, 511; 219/400, 401, 388

[56] References Cited

U.S. PATENT DOCUMENTS

| | | | |
|---|---|---|---|
| 2,767,667 | 10/1956 | Spooner | 426/496 |
| 3,718,082 | 2/1973 | Lipoma | 99/355 X |
| 4,006,260 | 2/1977 | Webb et al. | 426/438 |
| 4,277,510 | 7/1981 | Wicklund et al. | 426/441 |
| 4,387,630 | 6/1983 | Timbers et al. | 99/348 |
| 4,518,458 | 5/1985 | Greenfield et al. | 159/47.1 |
| 4,581,989 | 4/1986 | Swartley | 219/400 X |
| 4,721,625 | 1/1988 | Lee et al. | 426/438 |
| 4,738,193 | 4/1988 | Benson et al. | 99/404 |
| 4,933,199 | 6/1990 | Neel et al. | 426/438 |
| 4,942,808 | 7/1990 | Benson et al. | 99/339 X |
| 5,137,740 | 8/1992 | Benson et al. | 426/438 |
| 5,171,600 | 12/1992 | Young et al. | 426/550 |
| 5,188,859 | 2/1993 | Lodge et al. | 426/560 |
| 5,467,694 | 11/1995 | Mochizuki et al. | 99/355 |

OTHER PUBLICATIONS

Sketch showing prior art de–oiler inlet configuration, undated.

*Primary Examiner*—Timothy F. Simone
*Attorney, Agent, or Firm*—Rothwell, Figg, Ernst & Kurz, P.C.

[57] ABSTRACT

Improvements to a de-oiler apparatus, used to remove oil from food product chips after frying, include a perforated, inverted T-shaped baffle disposed in the inlet to the de-oiler and a flat, perforated plate disposed in the exit from the de-oiler. The T-shaped baffle and the perforated plate straighten the flow in the inlet and outlet regions, respectively, thereby decreasing the amount of steam which is lost from the chamber and reducing scattering of the chips, which hampers oil removal therefrom.

13 Claims, 5 Drawing Sheets

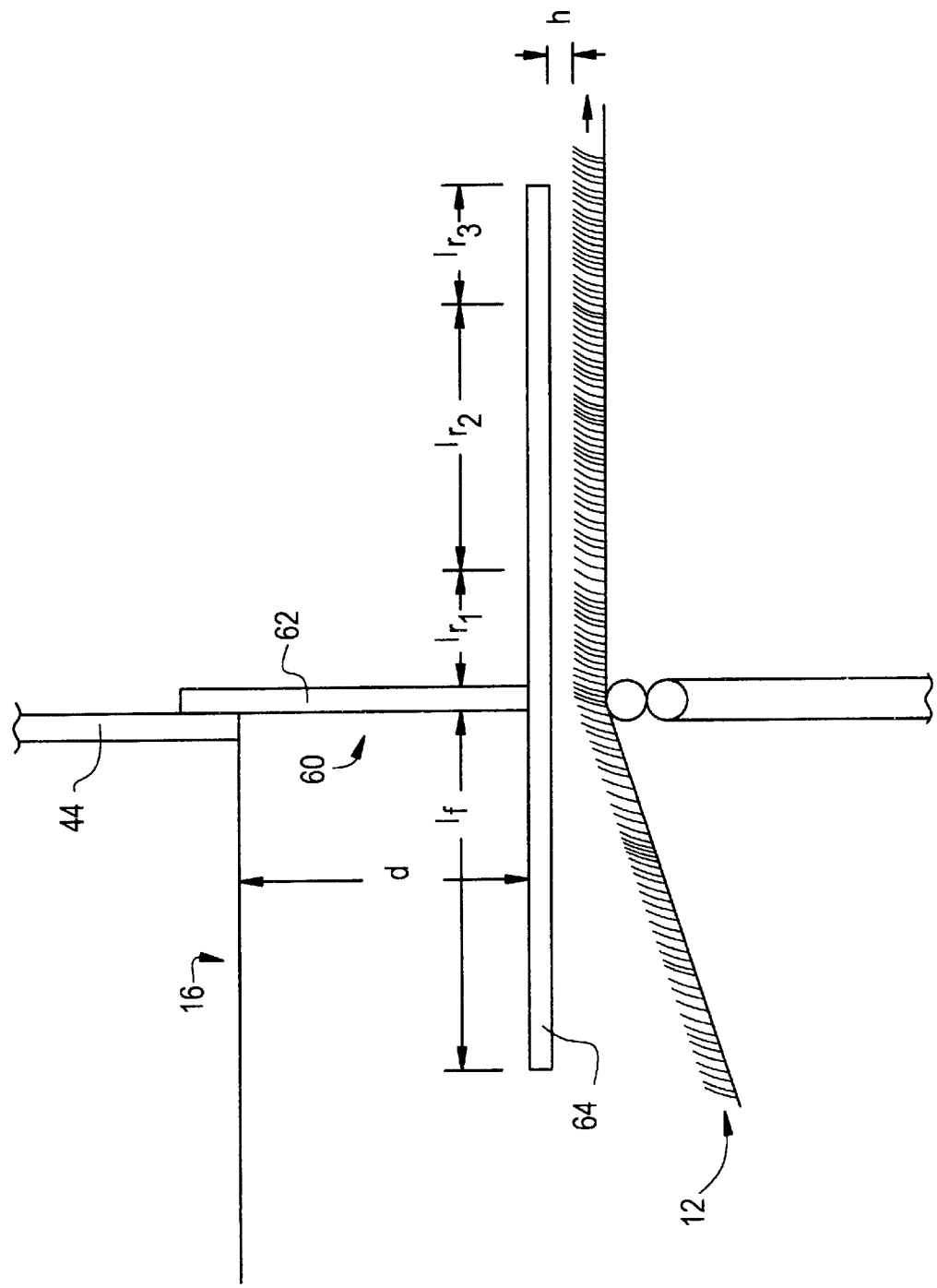

CHIP DE-OILER APPARATUS

FIELD OF THE INVENTION

The invention relates to apparatuses for producing fried food products such as potato chips or tortilla chips and, in particular, to improvements to apparatuses used to remove excess oil from the chips after they are fried.

BACKGROUND OF THE INVENTION

A generalized apparatus for removing oil from chips after they are fried is shown schematically in FIGS. 1 and 2. As shown in FIG. 1, the chips 12 are fried in an elongated vat of oil 10. The chips are caused to flow from left to right, as shown in FIG. 1. As the chips approach the end of the vat 10, they are picked up by an endless belt conveyor 14, which transports them through interchamber 16 and then through de-oiler apparatus 20. As shown in FIG. 1, the chips tend to arrange themselves in a "shingled" arrangement in which they are generally overlapping and standing on edge, similar to closely spaced dominoes.

As shown in FIG. 2, the de-oiler 20 is basically an annular chamber through which the chips travel (into the page in FIG. 2) on the conveyor 14. A series of blowers 22 are arranged along the length of the de-oiler 20 to circulate a steam atmosphere through the de-oiler 20, guided by turning vanes 21. As the steam passes through the bed of chips distributed across the width of the conveyor 14, it removes excess oil from the chips. The shingled arrangement of the chips facilitates circulation of the steam through the bed of chips and, hence, improves oil removal. (The belt of the endless belt conveyor 14 must be relatively porous or permeable for the steam to circulate through the chamber.) The removed oil is collected in oil collector trough 28 and is either filtered and reused or is discarded. The de-oiler also includes a de-mister 24, which separates oil from the steam, and a heat exchanger 26, which heats the steam to the desired temperature At the end of the de-oiler, the chips tumble off of the conveyor 14 into a rotary air lock 30 (FIG. 1). The airlock 30 functions like a revolving door, receiving chips via upper aperture 32 and dispensing them through lower aperture 34 onto take-away conveyor 36 while generally keeping the de-oiler sealed from the ambient atmosphere. This is generally required to contain the steam within the de-oiler-unit and to maintain a low-oxygen environment in the de-oiler unit.

As further shown in FIG. 1, the upper inlet wall 44 of the de-oiler has generally been provided with a rounded flow diverter 46 on the inside surface thereof, extending into the interior of the de-oiler, and the lower inlet wall 45 has been provided with a rounded flow diverter 47. Similarly, a rounded flow diverter 50 has generally been provided on the upper exit wall 52 of the de-oiler 20, extending into the interior thereof and a similarly shaped flow diverter 51 has been provided on the lower exit wall 53.

The flow diverters 46 and 47 help prevent the steam-enriched atmosphere from flowing out of the de-oiler through the inlet 42. Such a high speed exit flow tends to blow the chips over and destroys the shingled arrangement, thereby hampering de-oiling flow through the bed of chips. It also inhibits transfer of the chips to the de-oiler by blowing the chips back into the fryer. Similarly, the flow diverters 50 and 51 direct the steam atmosphere into the interior of the de-oiler and help minimize loss of steam through the rotary air lock 30. Moreover, it is desirable to prevent the relatively oxygen-rich atmosphere of the fry vat region from being sucked into the de-oiler chamber 20. To this end, various additional flow control devices have been used in connection with the baffles 46 and 47, but prior to the present invention, they have not worked as well as would be desired.

SUMMARY OF THE INVENTION

To improve the performance of the de-oiler apparatus in these regards, Applicants have significantly modified the inlet and outlet configurations of the de-oiler 20 in a manner that 1) reduces blow-back and blow-down of the chips, which destroys the shingled chip arrangement and the benefits thereof; 2) decreases significantly the amount of the steam-rich atmosphere which is lost through the inlet and the outlet, thereby reducing the amount of sparge steam (which is relatively expensive to produce) that needs to be fed into the de-oiler to maintain the environment therein at proper levels of steam and oxygen; and 3) significantly reduces the amount of oxygen-rich atmosphere entering the de-oiler unit from the fry vat region.

Thus, in a first aspect, the invention provides a device for removing excess oil from fried food products such as potato chips or tortilla chips. The device includes a chamber through which the food product passes on a bed in which steam flows to remove oil from the product. The chamber has an inlet through which the product enters the chamber and an outlet through which the product exits the chamber. A generally inverted T-shaped baffle having a generally planar stem portion and a perpendicular, generally planar cross portion is disposed within the inlet. Preferably, the stem portion, the cross portion, or both are perforated, with the perforations constituting approximately 20–50% of the total surface area of the baffle. More preferably, different portions of the baffle have different levels of porosity.

In another aspect, the invention features a device for removing excess oil from fried food products such as potato chips or tortilla chips. The device includes a chamber through which the food product passes on a bed and in which steam flows to remove oil from the product. The chamber has an inlet through which product enters the chamber and an outlet through which product exits the chamber. A generally planar baffle is disposed in the outlet from the chamber oriented generally parallel to the bed on which the product travels and extending transverse to the direction the product travels as it exits the chamber. A portion of the baffle extends into the chamber and a portion extends out of the chamber. Preferably, the baffle is perforated and, preferably, the perforations constitute approximately 40% of the total surface area of the baffle.

DESCRIPTION OF THE DRAWINGS

The invention will now be described in detail in conjunction with the following drawings in which

FIGS. 3 and 3a are schematic, side elevation views showing the inlet of a chip de-oiler according to the invention;

FIG. 4 is a perspective view of the perforated T-baffle shown in FIGS. 3 and 3a.

DETAILED DESCRIPTION OF PREFERRED EMBODIMENTS

Figure 3:
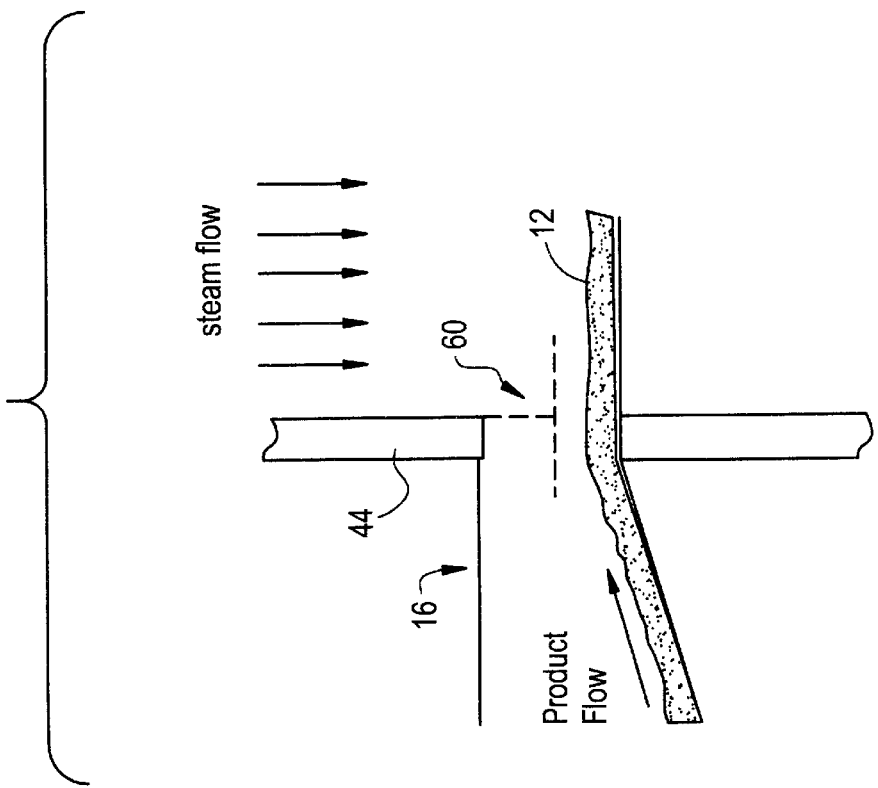

As shown in FIGS. 3 and 3a, a de-oiler according to the invention does away with the rounded flow diverters 46 and 47 on the upper and lower inlet walls 44 and 45, respectively, along with the other flow control devices that traditionally have been used. Instead, a de-oiler according to the invention has a generally inverted, T-shaped baffle 60. The baffle 60 is attached to the upper inlet wall 44 by means of the stem portion 62 of the baffle (FIG. 4), the plane of which is oriented generally perpendicular to the bed of chips 12 and extends generally transverse of the direction in which the chips are traveling. The cross portion 64 of the T is suspended above the bed of chips, generally parallel thereto. It will be noted that part of the cross portion of the baffle extends out of the product inlet 42 such that it is located exterior to the de-oiler chamber, i.e., extending into the interchamber 16, and part of the cross portion extends into the interior of the de-oiler chamber.

Figure 4:
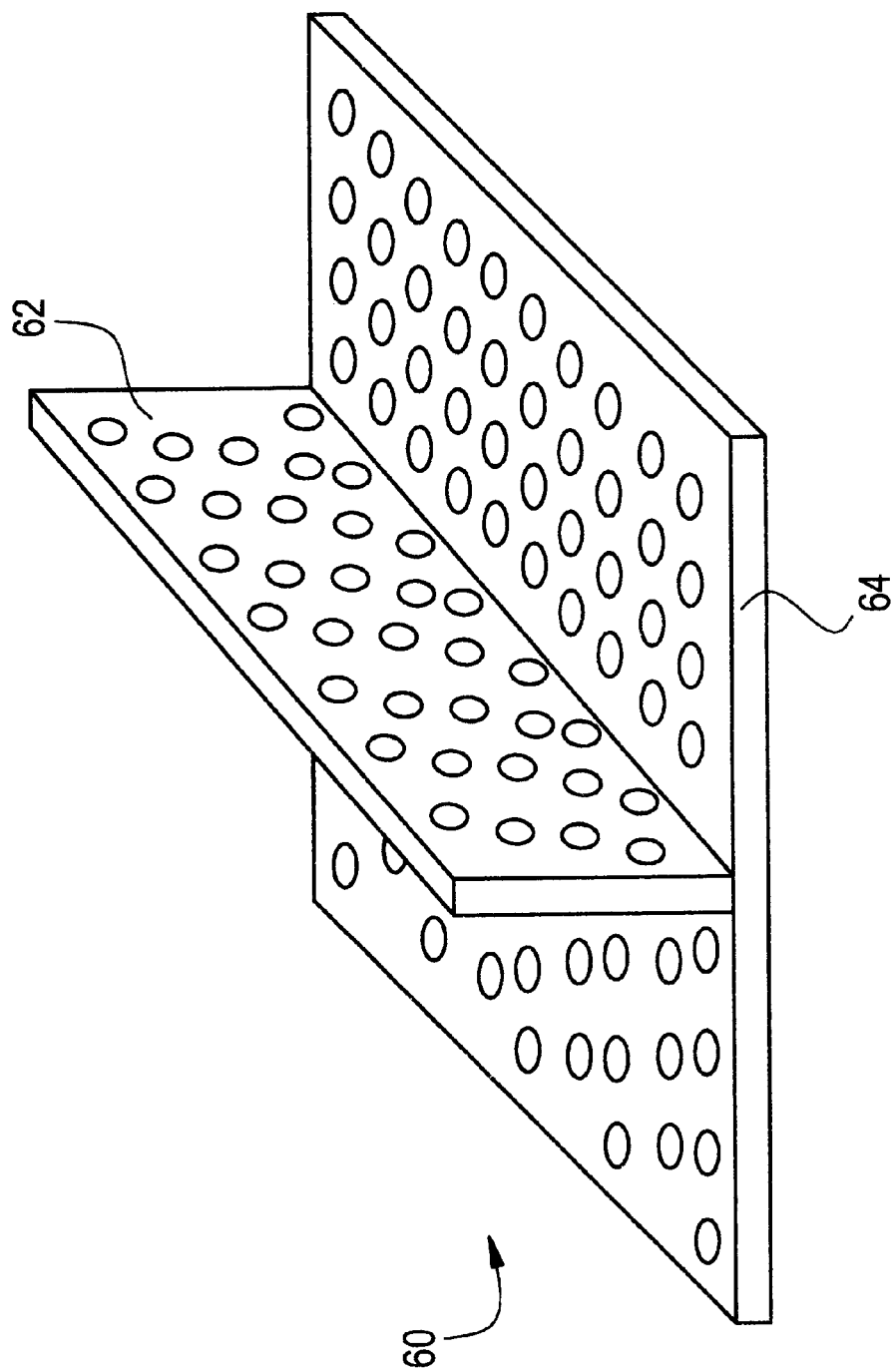

As shown in greater detail in FIG. 4, both the stem portion 62 and the cross portion 64 of the T-shaped baffle are perforated, with the perforation apertures extending therethrough. Preferably, the baffle is on the order of 20–50% perforated, i.e., 20–50% of the surface area of the baffle consists of aperture area or, in other words, 100% minus 20 to 50% of the surface is constituted by solid material. Preferably, the apertures have a diameter on the order of ¼ inch–¾ inch, and the spacing between the hole centers can be varied to vary the total perforation percentage.

A preferred configuration for a de-oiler unit with a downward steam flow velocity (in the region of the de-oiler inlet) of approximately 2000 ft./min. and an inlet width ranging from as low as 20 inches (400 pounds of product throughput per hour) to as large as 78 inches (5000 pounds of product throughput per hour) is shown in FIG. 3a. The baffle 60 is suspended from the upper inlet wall 44 such that the cross portion 64 is suspended a distance h above the chips of approximately ½ inch. Therefore, if the upper edge of the de-oiler inlet is on the order of 8 inches above the product bed, the cross portion 64 will be suspended a distance d of approximately 7½ inches below the upper edge of the de-oiler inlet.

The cross portion 64 is not necessarily symmetric with respect to the stem portion 62 of the baffle. Specifically, the front portion for this configuration extends a distance $l_f$ of approximately 10 inches in front of the stem portion 62. The rear of the cross portion 64, on the other hand extends a distance $l_{r1}+l_{r2}+l_{r3}$ of approximately 12 inches behind the stem portion 62. Preferably, the percentage porosity varies depending on the particular region of the baffle. Specifically, the stem portion 62 of the baffle has a porosity (% open area) on the order of 20%. The front part of the cross portion 64, i.e., the part extending forward by the distance $i_f$, has a porosity on the order of 30%. With respect to the rear "half" of the cross portion, the first approximate 3 inches ($l_{r1}$) has a porosity on the order of 30%; the next approximate 6 inches ($l_{r2}$) has a porosity on the order of 40%; and the last approximate 3 inches ($l_{r3}$) has a porosity on the order of 50%. As noted above, the spacing between hole centers can be varied to adjust the total perforation percentage in each of the regions; alternatively, the diameter of the perforations may be increased or decreased, or a combination of the two may be used to alter the total porosity in a given region.

With this configuration, the flow of the steam-rich atmosphere within the de-oiler is substantially straight and uniform through the product bed in the vicinity of the product inlet. As a result, the velocity of any of the atmosphere which flows out of the inlet is substantially decreased, and blow-back into the fryer, blow-down, or knock-over of the chips, which would destroy or reduce the shingled arrangement of the chips, is reduced. This results in improved, more efficient removal of oil from the chips. Additionally, the amount of steam which needs to be fed into the de-oiler to replace that which is lost (sparge steam) is reduced substantially, and the amount of oxygen entrained into the de-oiler from the interchamber region is also reduced significantly. This reduces oxidation of the oil stripped from the chips in the de-oiler, which increases the amount of oil that can be re-used in the fryer and decreases the amount that is thrown away.

Figure 1:
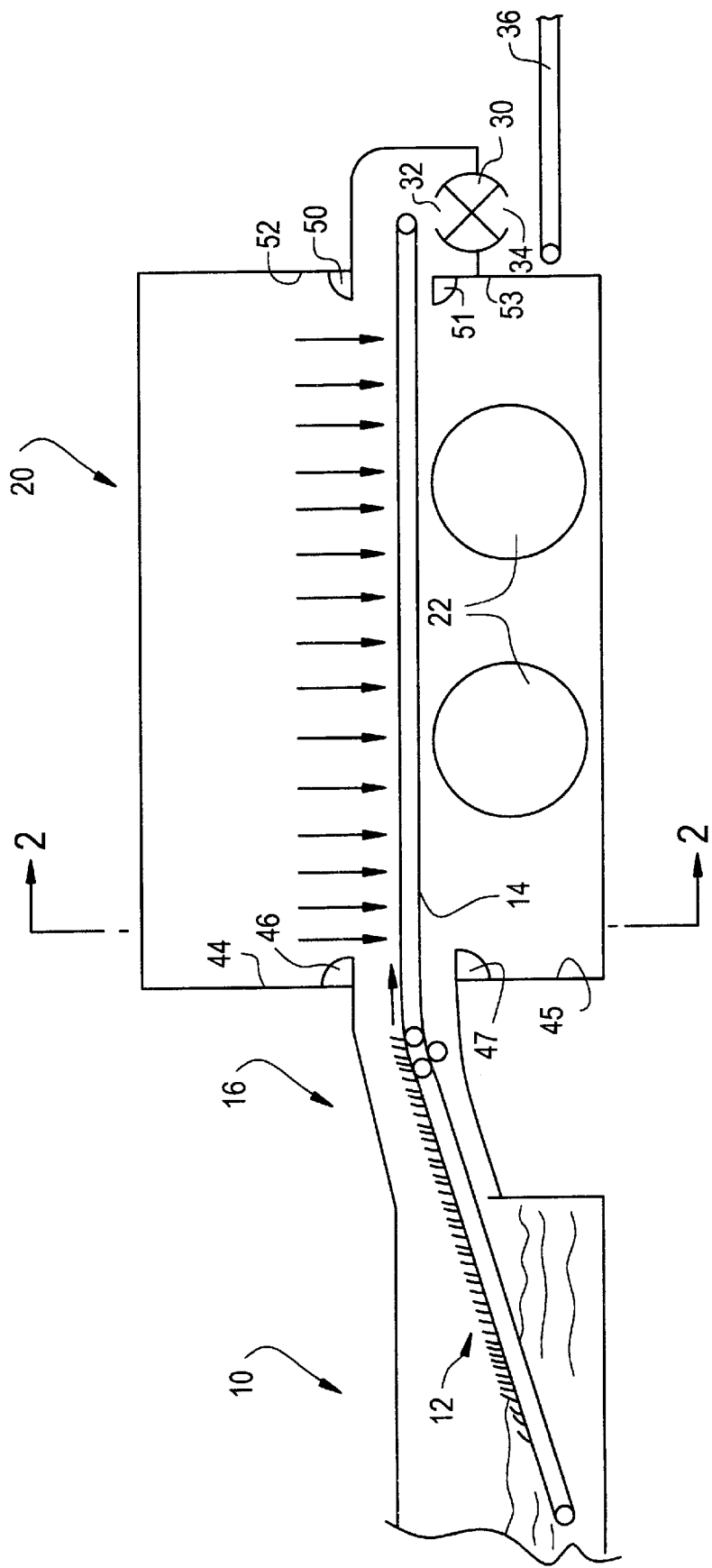
FIG. 1 is a generalized, schematic, side elevation view of a chip de-oiling apparatus.
Figure 2:
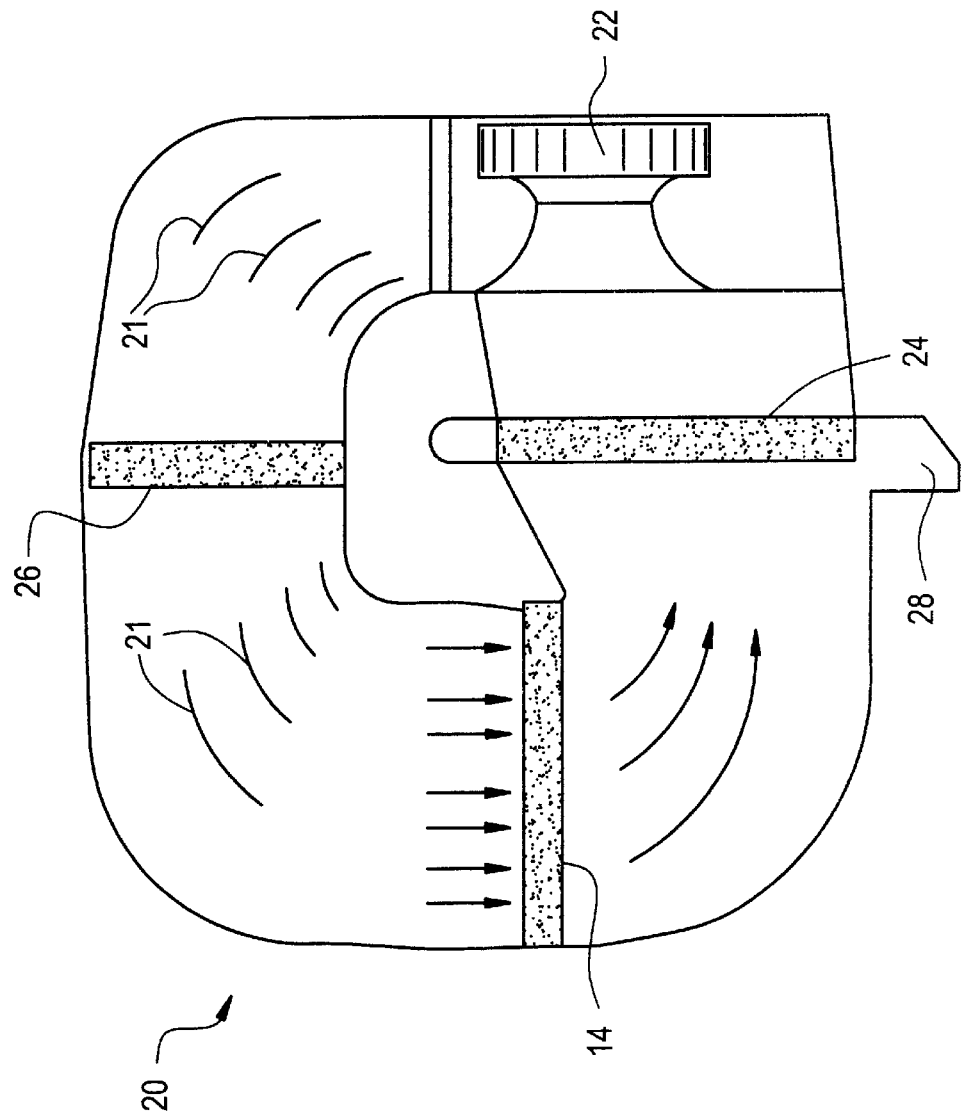
FIG. 2 is a schematic section view along the lines 2—2 in FIG. 1.
Figure 5:
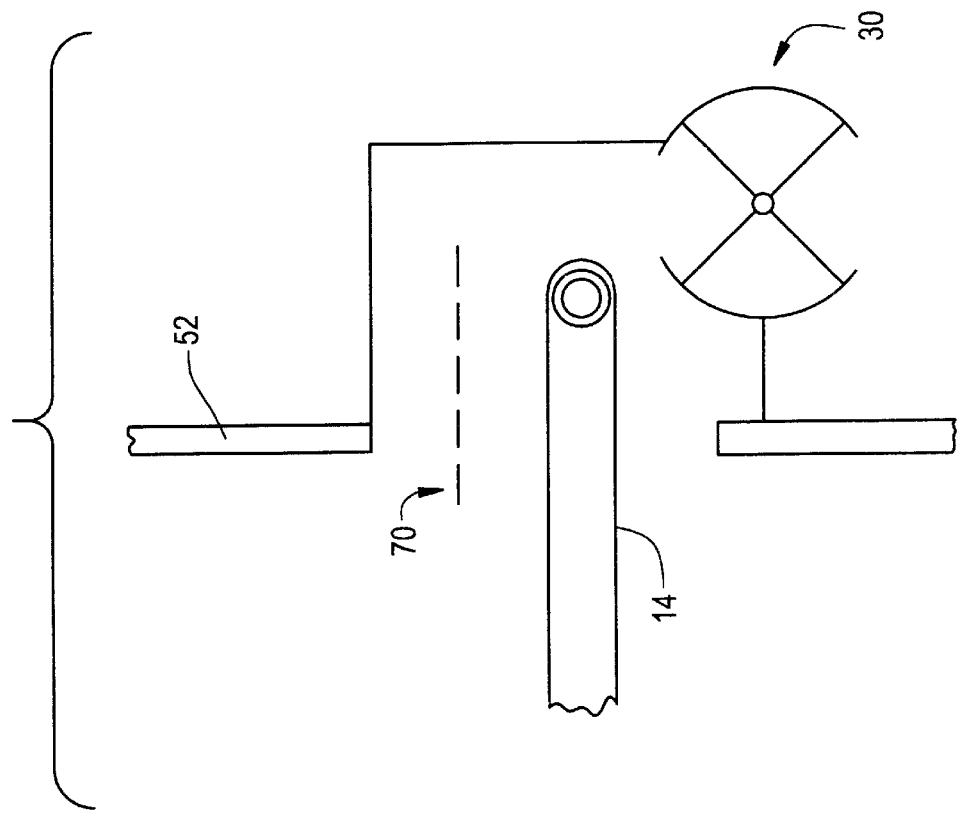
FIG. 5 is a schematic, side elevation view showing the outlet of a chip de-oiler according to the invention.

Similarly, as shown in FIG. 5, the rounded baffle 50 (FIG. 2) is eliminated from the upper outlet wall 52 and a flat, perforated plate 70 is positioned in the outlet. The perforated plate 70 is arranged above and with its plane generally parallel to the conveyor 14, and it extends generally transverse to the direction of travel of the chips. The perforated plate 70 is positioned partially within the interior of the de-oiler and partially outside of the de-oiler. Preferably, the entire perforated plate is on the order of 30% to 50% perforated, and more preferably 40%, i.e., 40% of the surface area consists of the apertures or, in other words, 100% minus 40% of the surface is constituted by solid material. Preferably, the apertures have a diameter on the order of ¼ inch–¾ inch.

By way of example, for a de-oiler unit that has an outlet on the order of 8 inches high and as wide as the inlet, the perforated plate is positioned approximately 2 inches above the bed of chips or approximately 6 inches from the upper edge of the outlet. The plate is preferably on the order of 18 inches long, with approximately 5 inches extending forward into the interior of the de-oiler unit and the remaining 13 inches extending backward into the region of the airlock.

Like the T-shaped baffle disposed in the inlet to the de-oiler, the perforated plate 70 substantially straightens and makes uniform the flow of the steam-enriched atmosphere within the de-oiler in the region of the outlet. This reduces the amount of steam lost through the outlet and also reduces turbulence which could otherwise cause breakage of a substantial portion of the chips. (Broken chips/"fines"/ crumbs can re-enter the de-oiler chamber and limit run time due to the need to shut down the line for cleaning.)

It will be appreciated that the embodiments disclosed herein are exemplary of the inventive concepts and that modifications thereto will occur to those having skill in the art. Such further configurations are deemed to be within the scope of the following claims.

The invention we claim is:

1. A device for removing excess oil from fried food product, said device comprising a chamber through which said product passes on a bed and in which steam flows to remove oil from said product, said chamber having an inlet through which said product enters said chamber and an outlet through which said product exits said chamber, said inlet being bounded by generally flat, vertically oriented upper and lower walls, and a baffle disposed within said inlet, said baffle having a generally T-shaped cross-section and comprising a generally planar stem portion and a generally perpendicular, generally planar head portion, the stem portion being oriented generally perpendicular to the bed and extending transverse to the direction of travel of the product as the product enters the chamber through said inlet, the head portion being oriented generally parallel to the bed and extending transverse to the direction of travel of the product as the product enters the chamber through said inlet, a portion of the head portion being disposed within said chamber and a portion of the head portion being disposed exterior to said chamber.

2. The device according to claim 1, wherein said baffle has perforations.

3. The device according to claim 2, wherein the stem portion is perforated.

4. The device according to claim 2, wherein the cross portion is perforated.

5. The device according to claim 2, wherein the stem portion and the cross portion are perforated.

6. The device according to claim 2, wherein said perforations constitute between approximately 20% and approximately 50% of the surface area of the baffle.

7. The device according to claim 2, wherein different portions of said baffle have different degrees of perforation.

8. The device according to claim 6, wherein different portions of said baffle have different degrees of perforation.

9. A device for removing excess oil from fried food product, said device comprising a chamber through which said product passes on a bed and in which steam flows to remove oil from said product, said chamber having an inlet through which said product enters said chamber and an outlet through which said product exits said chamber, said inlet being bounded by generally flat, vertically oriented upper and lower walls, and a generally planar baffle disposed within said outlet, said baffle being oriented generally parallel to said bed and extending transverse to the direction of travel of the product as said product exits said chamber through said outlet, a portion of said baffle being disposed within said chamber and a portion of said baffle being disposed exterior to said chamber.

10. The device according to claim 9, wherein said baffle has perforations.

11. The device according to claim 9, wherein said perforations constitute approximately 30% to 50% of the surface area of the baffle.

12. The device according to claim 11, wherein said perforations constitute approximately 40% of the surface area of the baffle.

13. A device for removing excess oil from fried food product, said device comprising a chamber through which said product passes on a bed and in which steam flows to remove oil from said product, said chamber having an inlet through which said product enters said chamber and an outlet through which said product exits said chamber, said inlet being bounded by generally flat, vertically oriented upper and lower walls, an inlet baffle disposed within said inlet, said inlet baffle having a generally T-shaped cross-section and comprising a generally planar stem portion and a generally perpendicular, generally planar cross portion, the stem portion being oriented generally perpendicular to the bed and extending transverse to the direction of travel of the product as the product enters the chamber through said inlet, the head portion being oriented generally parallel to the bed and extending transverse to the direction of travel of the product as the product enters the chamber through said inlet, a portion of the head portion being disposed within said chamber and a portion of the head portion being disposed exterior to said chamber, and a generally planar outlet baffle disposed within said outlet, said outlet baffle being oriented generally parallel to said bed and extending transverse to the direction of travel of the product as said product exits said chamber through said outlet, a portion of said outlet baffle being disposed within said chamber and a portion of said outlet baffle being disposed exterior to said chamber.

* * * * *